Patented July 24, 1934

1,967,364

UNITED STATES PATENT OFFICE 1,967,364

HALOGENANTHRAQUINONE-BENZACRIDONES

Max Albert Kunz, Mannheim, and Karl Koeberle and Erich Berthold, Ludwigshafen-on-the-Rhine, Germany, assignors to General Aniline Works, Inc., New York, N. Y., a corporation of Delaware No Drawing. Application October 23, 1930, Serial No. 490,811. In Germany October 28, 1929

7 Claims. (Cl. 260—37)

The present invention relates to new chloro-anthraquinone-2.1(N)-benzacridones and process of producing and halogenating the same.

We have found that anthraquinone-2.1(N)-benzacridones (α-naphthoquinoneacridones) corresponding to the formula:

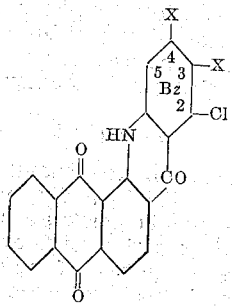

in which the positions marked X may be substituted by chlorine, are valuable vat dyestuffs in view of the yellowish to bluish red shades of excellent fastness against light and atmospheric influences obtained on cotton therewith. The said dyestuffs may be prepared according to known methods by condensing a 1-halogenanthraquinone-2-carboxylic acid or an ester or an amide thereof with 3-chloroaniline or 3.4.5-trichloroaniline, or by condensing a 1-halogenanthraquinone with an anthranilic acid substituted by chlorine in correspondence with the aforesaid chloroanilines, the condensation products being then converted into acridone derivatives.

The condensation may be carried out in the presence or absence of dissolving or diluting media and/or of acid-binding agents and preferably in the presence of condensing catalysts, as for example copper or its compounds. The ring closure of the carboxylic acids or carboxylic acid derivatives to the corresponding acridones may sometimes be effected simultaneously with the condensation, as for example by the addition of a suitable condensing agent, such as oxalic acid, boric acid, phosphorus pentachloride or phosphorus pentoxide. The intermediately formed alpha-phenylaminocarboxylic acids may, however, also be isolated and converted into the corresponding acridone derivatives in any known and suitable manner, as for example by warming with phosphorus pentachloride or thionyl chloride, preferably in an organic solvent or by treatment with acid condensing agents, as for example oleum, sulphuric acid or chlorosulphonic acid.

The production of Bz2-chloroanthraquinone-2.1-benzacridone from 3-chloroaniline furnishes two isometric products, viz: Bz2- and Bz4-monochloroanthraquinone - 2.1 - benzacridone. The Bz2-halogen product can be separated from the isometric compound by crystallization from organic solvents, in particular nitrobenzene in which the Bz4-comopund is more difficulty soluble. The two isometric products may also be separated by way of their oxonium sulphates, by dissolving the mixture of the two compounds in concentrated sulphuric acid and adding limited amounts of water to the solution. The oxonium sulphate of the Bz4-compound separates first, is filtered off, and the Bz2-compound is then precipitated in the form of its oxonium sulphate by the addition of further amounts of water. The oxonium sulphate is then decomposed by means of water. The Bz2-compound is also obtained when the condensation to form the acridone ring is effected by means of phosphorus halides in organic media, preferably at elevated temperature, for example at 80° C., whereby the Bz2-compound separates first.

The shades obtained with the aforesaid chloro-anthraquinone-2.1(N)-benzacridones may be varied within the range mentioned by treating the said acridones in organic solvents with halogenating agents, whereby when halogenating in the absence of halogenation catalysts the halogen enters the benzene nucleus and products are obtained dyeing from orange to yellowish red shades, when halogenating, however, in the presence of the said catalysts the halogen first enters the 4-position of the anthraquinone nucleus whereby the shades obtained with these latter dyestuffs are yellowish red to pink or bluish red. Organic solvents which may be used in the halogenation process comprise in particular aromatic solvents of high boiling point, such as for example nitrobenzene, chlorobenzenes, homologues of the said derivatives of benzene, naphthalene and derivatives thereof. As halogenation catalysts those usually employed may be used, for example metals and metal compounds, such as iron, mercury, antimony and their halides, or non-metals, such as sulphur, selenium and in particular iodine.

The aforesaid chloroanthraquinone-2.-benzacridones are usually obtained in very good yields and in a pure state. They may, however, be purified by known methods if necessary, as for example by crystallization from organic solvents, by sublimation, by treatment with oxidizing agents, for example by treating their aqueous pastes with alkali metal hypochlorites, or by way of their oxonium salts.

The following examples will further illustrate how the said invention may be carried out in practice, but the invention is not restricted to these examples. The parts are by weight.

Example 1

28.6 parts of 1-chloroanthraquinone-2-carboxylic acid are heated to boiling, while stirring, in 250 parts of trichlorobenzene with 16 parts of meta-chloroaniline and 10 parts of anhydrous boric acid, until unchanged chloroanthraquinone carboxylic acid can no longer be detected. After cooling, the reaction product which is mainly the 1-meta-chloroanilinoanthraquinone-2-carboxylic acid, is filtered off.

In order to convert the reaction product into the corresponding acridone derivative, 10 parts thereof are dissolved in 100 parts of chlorosulphonic acid and the solution stirred at 40° C. until a sample furnishes a violet vat with an alkaline solution of hydrosulphite. The condensation of the 1-chloro-anthraquinone-2-carboxylic acid with meta-chloroaniline and ring closure to the acridone may also be carried out in a single operation by carrying out the reaction, for example in nitrobenzene and adding phosphorus pentachloride after the formation of the 1-meta-chloroanilinoanthraquinone-2-carboxylic acid.

Example 2

The reaction product obtainable according to the foregoing example which is a mixture of Bz2- and Bz4-chloroanthraquinone-2.1-benzacridone can be separated in the following manner: 10 parts of the reaction product are dissolved, while heating, in 500 parts of nitrobenzene, and the solution allowed to cool to about 80° C. whereby a part of the dissolved acridone separates out, the precipitate, which is the Bz4-chloroacridone, then being filtered off. On further cooling practically pure Bz2-chloroanthraquinone-2.1-benzacridone crystallizes from the nitrobenzene. It dyes cotton from a violet vat bluish red shades and is particularly suitable for printing purposes.

By treating the meta-chloroanilinoanthraquinone-2-carboxylic acid in nitrobenzene with phosphorus pentachloride and filtering off the reaction product at about 80° C. practically pure Bz2 - chloroanthraquinone -2.1- benzacridone is obtained, while the Bz4-chloro-acridone remains in the filtrate.

The separation of the two isomeric products may also be carried out by way of their oxonium sulphates.

Example 3

57.2 parts of 1-chloroanthraquinone-2-carboxylic acid are slowly heated to boiling while stirring in 500 parts of trichlorobenzene with 45 parts of 3.4.5-trichloroaniline after the addition of 25 parts of boric acid, the reaction mixture being boiled until unchanged 1-chloroanthraquinone-2-carboxylic acid can no longer be detected, which is usually the case after between 5 and 8 hours. The reaction mixture is then allowed to cool and the reaction product which separates out in crystalline form and in a good yield is filtered off. It consists mainly of Bz2.3.4-trichloroanthraquinone-2.1-benzacridone besides a little 3.4.5-trichloro-1-phenylaminoanthraquinone-2-carboxylic acid. In order to convert the reaction product completely into the acridone derivative, it is warmed for a short time at between 40° and 50° C. in 5 parts of chlorosulphonic acid, or its suspension in nitrobenzene is treated with phosphorus pentachloride. Bz2.3.4 - trichloroanthraquinone-2.1-benzacridone practically free from the corresponding carboxylic acid may also be obtained by heating the initial reaction mixture for a longer period of time. The said benzacridone obtained crystallizes in orange red needles, dissolves in concentrated sulphuric acid to an orange solution and dyes the vegetable fibre from a violet vat clear yellowish red shades of excellent fastness to light and atmospheric influences.

The crude dyestuff can be purified, if necessary, either by way of its oxonium sulphate by dissolving it in concentrated sulphuric acid, precipitating by the addition of small amounts of water the corresponding oxonium sulphate and decomposing the latter by means of water, or by treating it with oxidizing agents, as for example by treating its aqueous paste with a solution of sodium hypochlorite.

Esters or amides of 1-chloroanthraquinone-2-carboxylic acid, or 1-bromoanthraquinone-2-carboxylic acids may be used for the condensation instead of 1-chloroanthraquinone-2-carboxylic acid.

Example 4

50 parts of Bz2-chloroanthraquinone-2.1-benzacridone are heated to boiling in 300 parts of trichlorobenzene while passing a current of chlorine through the reaction mixture until a sample furnishes pure red shades. The reaction mixture is then allowed to cool and worked up as usual. The Bz2.3.5 - trichloroanthraquinone - 2.1 - benzacridone thus obtain dissolves in concentrated sulphuric acid giving an orange solution and dyes cotton clear strong red shades of very good fastness.

Example 5

42.8 parts of Bz2.3.4-trichloroanthraquinone-2.1-benzacridone are suspended in 500 parts of nitrobenzene and heated to 170° C. while stirring, after the addition of 4 parts of iodine, 1 part of iron and 45 parts of bromine, the reaction mixture being kept at the said temperature until the bulk of the bromine is used up. The reaction mixture is then allowed to cool and the reaction product, a trichlorobromanthraquinone-2.1-benzacridone, filtered off. It is orange crystalline powder, which dissolves in concentrated sulphuric acid to give an orange solution and dyes cotton orange shades of very good fastness to light and atmospheric influences.

Example 6

7 parts of Bz2-chloroanthraquinone-2.1-benzacridone, obtainable by condensation of 1-chloroanthraquinone-2-carboxylic acid with m-chloroaniline and ring closure in trichlorobenzene at 80° C. by means of phosphorus pentachloride to form the acridone derivative, are suspended in 100 parts of nitrobenzene and heated to 100° C., while stirring, after the addition of 0.5 part of iodine. 10 parts of bromine are then run into the reaction mixture which is kept at between 160° and 180° C. for several hours, allowed to cool, and the bromochloroanthraquinone-2.1-benzacridone obtained is filtered off. It is a red crystalline powder which dissolves in concentrated sulphuric acid to give an orange solution and dyes the vegetable fibres blue red shades of very good fastness from a violet vat.

Example 7

42.8 parts of Bz2.3.4-trichloroanthraquinone-2.1-benzacridone, obtainable by condensation of 1-chloroantraquinone-2-carboxylic acid with 3.4.5-trichloroaniline and simultaneous ring closure to form the acridone derivative, are suspended in 428 parts of nitrobenzene and slowly heated, while stirring, to 80° C. after the addition of 2 parts of iodine and 60 parts of sulphuryl chloride; the whole is kept at the said temperature for several hours, then heated to 120° C. and kept at the same temperature until a sample furnishes clear pure pink shades. The reaction mixture is then allowed to cool and the reaction product which separates in a crystalline form is filtered off. It is a pentachloro derivative according to analysis, dissolves in concentrated sulphuric acid giving an orange solution and furnishes a blue violet vat.

A tetra-chloroderivative dyeing orange shades is obtained in the aforesaid manner in the absence of iodine.

Example 8

42.8 parts of Bz2.3.4-trichloroanthraquinone-2.1-benzacridone, obtainable by condensation of 1-chloro-anthraquinone-2-carboxylic acid with 3.4.5-trichloroaniline and ring closure to form the acridone derivative, are suspended in 500 parts of trichlorobenzene, 1 part of iodine is then added and the reaction mixture heated to boiling while passing therein a current of dry chlorine. When a sample taken from the reaction mixture worked up and dissolved in concentrated sulphuric acid separates therefrom in blue red flakes on the addition of water, the reaction mixture is allowed to cool and the reaction product which separates in beautiful crystals is filtered off. It is a pentachloro derivative according to analysis. The dyestuff may also be recovered by distilling off the solvent if desired under reduced pressure. The yield is practically theoretical. The product dissolves in concentrated sulphuric acid to give an orange solution and dyes the vegetable fibre pink shades of excellent fastness and brilliancy from a blue violet vat.

What we claim is:—

1. Chloroanthraquinone-2.1(N)-benzacridones corresponding to the formula:

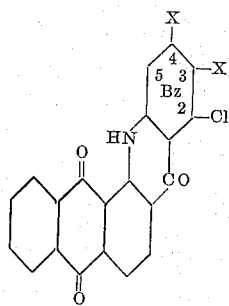

wherein both X's stand for hydrogen or both X's stand for chlorine crystallizing in orange red to red needles, dissolving in concentrated sulphuric acid to give orange solutions and dyeing cotton from violet vats yellowish red to bluish red shades.

2. Bz2-chloroanthraquinone-2.1(N)-benzacridone crystallizing in red needles, dissolving in concentrated sulphuric acid to give an orange solution and dyeing cotton from a violet vat bluish red shades.

3. Bz2.3.4-trichloroanthraquinone-2.1(N)-benzacridone crystallizing in orange red needles, dissolving in concentrated sulphuric acid to give an orange solution and dyeing cotton from a violet vat yellowish red shades.

4. A process for the manufacture of halogen-anthraquinone - 2.1(N) - benzacridones, which comprises treating a chloroanthraquinone-2.1(N)-benzacridone corresponding to the formula:

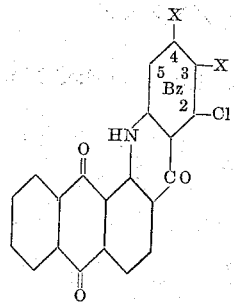

in which the positions marked X may be substituted by chlorine, in an organic solvent with a halogenating agent.

5. A process for the manufacture of halogen-anthraquinone - 2.1(N) - benzacridones, which comprises treating a chloroanthraquinone-2.1(N)-benzacridone corresponding to the formula:

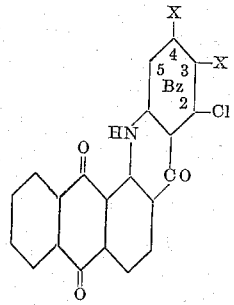

in which the positions marked X may be substituted by chlorine, in an aromatic solvent of high boiling point with a halogenating agent.

6. A process for the manufacture of halogen-anthraquinone - 2.1(N) - benzacridones, which comprises treating a chloroanthraquinone-2.1(N)-benzacridone corresponding to the formula:

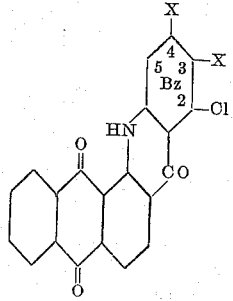

in which the positions marked X may be substituted by chlorine, in an aromatic solvent of high boiling point with a halogenating agent in the presence of a halogenation catalyst.

7. A process for the manufacture of halogen-anthraquinone-2.1(N)-benzacridones, which comprises treating a chloroanthraquinone-2.1(N)-benzacridone corresponding to the formula:

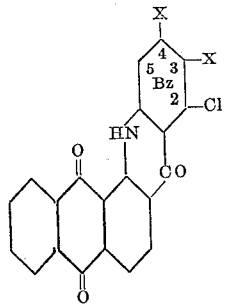

in which the positions marked X may be substituted by chlorine, in an aromatic solvent of high boiling point with a halogenating agent in the presence of iodine.

MAX ALBERT KUNZ.
KARL KOEBERLE.
ERICH BERTHOLD.